United States Patent
Pawar et al.

(10) Patent No.: US 9,622,242 B1
(45) Date of Patent: Apr. 11, 2017

(54) BEAM FORMING BASED REDUNDANCY SELECTION

(71) Applicant: Sprint Spectrum LP, Overland Park, KS (US)

(72) Inventors: Hemanth Pawar, Brambleton, VA (US); Shilpa Kowdley Srinivas, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/961,023

(22) Filed: Dec. 7, 2015

(51) Int. Cl.
*H04B 7/04* (2006.01)
*H04W 72/04* (2009.01)
*H04B 7/06* (2006.01)

(52) U.S. Cl.
CPC ...... *H04W 72/0446* (2013.01); *H04B 7/0617* (2013.01)

(58) Field of Classification Search
CPC  H04L 5/00; H04W 4/00; H04W 4/12; H04W 5/00; H04W 16/28; H04W 24/02; H04W 72/0446; H04W 88/08; H04W 36/30; H04B 7/04; H04B 7/212; H04B 7/0615; H04B 7/0617; H04B 7/0632
See application file for complete search history.

(56) References Cited

U.S. PATENT DOCUMENTS

| | | | |
|---|---|---|---|
| 9,420,474 B1 * | 8/2016 | Pawar | H04W 16/28 |
| 2005/0053123 A1 * | 3/2005 | Higuchi | H01Q 3/2605 375/148 |
| 2013/0230081 A1 * | 9/2013 | Wernersson | H04B 7/0617 375/219 |
| 2013/0250924 A1 | 9/2013 | Chen et al. | |
| 2014/0198664 A1 | 7/2014 | Chen et al. | |
| 2015/0105025 A1 * | 4/2015 | Zhang | H01Q 3/26 455/63.4 |

* cited by examiner

*Primary Examiner* — Mohamed Kamara

(57) ABSTRACT

At certain beamforming angles (i.e., those greater than a threshold amount) a sidelobe of a beamforming pattern used by a first sector may be pointed at wireless devices being serviced by a second sector. This causes the interference experienced by the first sector to be increased due to the transmissions of the wireless devices being serviced by the second sector. To help mitigate the interference experienced by the first sector, when the access node determines it is using a beamforming angle that may be susceptible to interference from the second sector (e.g., beamforming angle greater than a threshold), the first sector selects an amount of TTI bundling to be used by a wireless device. By configuring a wireless device to use TTI bundling (i.e., increase redundancy), the link budget for the wireless device is improved thereby lessening the effects of the interference being received via the sidelobe.

20 Claims, 7 Drawing Sheets

```
┌─────────────────────────────────────────┐
│ USING, BY A FIRST SECTOR OF AN ACCESS   │
│ NODE, BEAMFORMING HAVING A FIRST MAIN   │
│ LOBE ANGLE TO RECEIVE COMMUNICATION     │
│ FROM A FIRST WIRELESS DEVICE            │
│                   502                   │
└─────────────────────────────────────────┘
                    │
┌─────────────────────────────────────────┐
│ USING, BY A SECOND SECTOR OF THE ACCESS │
│ NODE, BEAMFORMING HAVING A SECOND MAIN  │
│ LOBE ANGLE TO RECEIVE COMMUNICATION     │
│ FROM A SECOND WIRELESS DEVICE           │
│                   504                   │
└─────────────────────────────────────────┘
                    │
┌─────────────────────────────────────────┐
│ BASED ON THE FIRST ANGLE AND THE SECOND │
│ ANGLE, SELECT A TTI BUNDLING SIZE       │
│                   506                   │
└─────────────────────────────────────────┘
```

FIGURE 5

```
┌─────────────────────────────────────────┐
│ USING, BY A FIRST SECTOR OF AN ACCESS NODE, │
│ BEAMFORMING HAVING A FIRST MAIN LOBE ANGLE │
│   TO RECEIVE COMMUNICATION FROM A FIRST │
│              WIRELESS DEVICE            │
│                   602                   │
└─────────────────────────────────────────┘
                    │
┌─────────────────────────────────────────┐
│  USING, BY A SECOND SECTOR OF THE ACCESS │
│ NODE, BEAMFORMING HAVING A PLURALITY OF MAIN │
│ LOBE ANGLES TO RECEIVE COMMUNICATION FROM │
│  A RESPECTIVE PLURALITY OF SECOND WIRELESS │
│                 DEVICES                 │
│                   604                   │
└─────────────────────────────────────────┘
                    │
┌─────────────────────────────────────────┐
│ DETERMINE A NUMBER OF THE PLURALITY OF MAIN │
│ LOBE ANGLES THAT MEET A THRESHOLD CRITERIA │
│                   606                   │
└─────────────────────────────────────────┘
                    │
┌─────────────────────────────────────────┐
│   COMMUNICATE THE NUMBER OF THE PLURALITY OF │
│    MAIN LOBE ANGLES THAT MEET THE THRESHOLD │
│   CRITERIA TO THE FIRST SECTOR OF THE ACCESS │
│                   NODE                  │
│                   608                   │
└─────────────────────────────────────────┘
                    │
┌─────────────────────────────────────────┐
│  BASED ON THE FIRST ANGLE AND THE NUMBER OF │
│  THE PLURALITY OF MAIN LOBE ANGLES THAT MEET │
│  THE THRESHOLD CRITERIA, SELECT A TTI BUNDLING │
│    SIZE FOR COMMUNICATION FROM THE FIRST │
│              WIRELESS DEVICE            │
│                   610                   │
└─────────────────────────────────────────┘
```

FIGURE 6

BEAM FORMING BASED REDUNDANCY SELECTION

TECHNICAL BACKGROUND

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fifth generation communication system (5G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Transmit beamforming uses multiple antennas to control the direction of a transmission by appropriately weighting the magnitude and phase of the signals sent to individual antennas. Receive beamforming appropriately amplifies (i.e., weights) and delays (i.e., adjusts phase) the signals from each antenna. Different weighting patterns (e.g., Dolph-Chebyshev) can be used to achieve desired sensitivity patterns. Typically, a main lobe is produced together with nulls and sidelobes. As well as controlling the main lobe width (the beam) and the sidelobe levels, the position (i.e., angle) of a null and the main lobe can be controlled. This is useful to increase sensitivity in one particular direction, while decreasing sensitivity to interference from other directions. A similar result can be obtained on transmission. These beam steering techniques can help provide better coverage to specific areas near the edges of wireless coverage.

Another technique to improve wireless coverage is transmit time interval (TTI) bundling. When activated, TTI bundling configures a user equipment (UE) device to send the same transport block, but with different error detection and correction information, in multiple consecutive transmit time intervals. This redundant transmission of transport blocks can effectively improve coverage by up to 4 dB.

Overview

In an embodiment, a method of operating a communication system, includes determining whether a first sector of an access node is using beamforming to receive communication from a wireless device. Whether a first angle of a first main beamforming lobe being used by the first sector to receive communication from the wireless device meets a first threshold criteria is determined. Whether a second sector of the access node is using beamforming to receive communication is determined. Whether a second angle of a second main beamforming lobe being used by the second sector to receive communication meets a second threshold criteria is determined. Based on at least one of whether the first sector of an access node is using beamforming to receive communication from the wireless device, whether the first threshold criteria is met, whether the second sector of the access node is using beamforming to receive communication, and whether the second threshold criteria is met, it is determined whether to use TTI bundling to communicate with the wireless device.

In an embodiment, a communication system includes a first sector of an access node, a second sector of the access node, and a processing node. The first sector can use beamforming to receive communication from a wireless device. The second sector of the access node can use beamforming to receive communication. The processing node determines whether a first sector of an access node is using beamforming to receive communication from a wireless device. The processing node determines whether a first angle of a first main beamforming lobe being used by the first sector to receive communication from the wireless device meets a first threshold criteria. The processing node determines whether a second sector of the access node is using beamforming to receive communication. The processing node determines whether a second angle of a second main beamforming lobe being used by the second sector to receive communication meets a second threshold criteria. Based on at least one of whether the first sector of an access node is using beamforming to receive communication from the wireless device, whether the first threshold criteria is met, whether the second sector of the access node is using beamforming to receive communication, and whether the second threshold criteria is met, the processing node determines whether to use TTI bundling to communicate with the wireless device.

In an embodiment, a method of operating a communication system includes receiving, at a first sector of an access node, communication from a wireless device using beamforming by the first sector. At a second sector of the access node, communication from at least one additional wireless device is received using beamforming by the second sector. Based on the first sector using beamforming to receive communication from the wireless device, and based on the second sector using beamforming to receive communication from the at least one additional wireless device, and based on a first angle of a first main beamforming lobe being used by the first sector to receive communication from the wireless device meeting a first threshold criteria, a TTI bundling size is selected to be used by the first sector for communication from the wireless device.

BRIEF DESCRIPTION OF THE DRAWINGS

FIG. 5 is a flowchart illustrating a TTI bundling size selection method.

FIG. 6 is a flowchart illustrating a selection method that is based on beamforming angles.

DETAILED DESCRIPTION

In an embodiment, the sectors of an access node are configured to use beamforming to receive uplink communication from wireless devices. At certain beamforming angles (i.e., those greater than a threshold amount) a sidelobe of the beamforming pattern used by a first sector may be pointed at wireless devices being serviced by a second sector. This causes the interference experienced by the first sector to be increased due to the transmissions of the wireless devices being serviced by the second sector.

To help mitigate the interference experienced by the first sector, when the access node determines it is using a beamforming angle that may be susceptible to interference from the second sector (e.g., a beamforming angle greater than a threshold), the first sector selects an amount of TTI bundling to be used by a wireless device. By configuring a wireless device to use TTI bundling (or otherwise increase redundancy), the link budget for the wireless device is improved thereby lessening the effects of the interference being received via the sidelobe.

Figure 1:
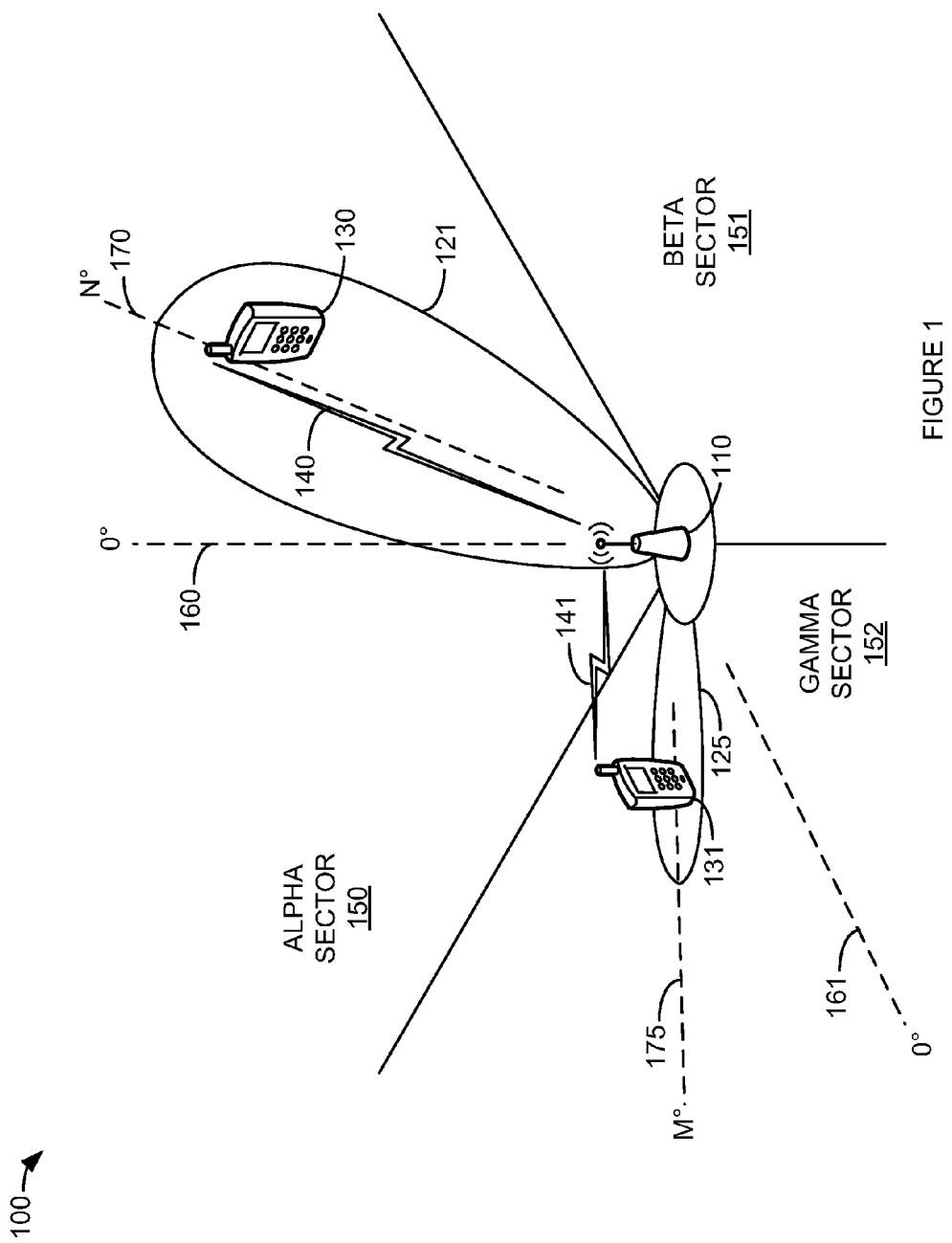
FIG. 1 is a block diagram illustrating a communication system.

FIG. 1 is a block diagram illustrating a communication system. In FIG. 1, communication system 100 comprises access node 110, wireless device 130, and wireless device 131. Access node 110 includes three sectors: alpha sector 150, beta sector 151, and gamma sector 152. Wireless device 130 is operatively coupled to access node 110 via wireless link 140. Wireless device 131 is operatively coupled to access node 110 via wireless link 141. Wireless device 130 is positioned in alpha sector 150. Wireless device 131 is positioned in gamma sector 152.

In FIG. 1, alpha sector 150 of access node 110 is illustrated with a main beamforming lobe 121 directed at an angle of N° from the center (i.e., 0°) of alpha sector 150. This angle of N° directs main beamforming lobe 121 at wireless device 130. Alpha sector 150 of access node 110 is also illustrated as having a sidelobe 125 directed at an angle of M° from the center (i.e., 0°) of gamma sector 152. Thus, in FIG. 1, sidelobe 125 of alpha sector 150 is illustrated lying in gamma sector 152, and directed at wireless device 131.

Access node 110 is a network node having a plurality of sectors 150-152 each of which is capable of providing wireless communication to wireless device 130 and wireless device 131. Access node 110 can be, for example, one or more of a base transceiver station, a radio base station, an eNodeB device, or an enhanced eNodeB device.

Communication system 100 is a communication network that can provide wireless communication to wireless device 130 and wireless device 131. Communication system 100 and an included network (not shown in FIG. 1) can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 and its included network can also comprise wireless networks, including base station, wireless communication nodes, telephony switches, internet routers, network gateways, computer systems, communication links, or some other type of communication equipment, and combinations thereof.

Wired network protocols that may be utilized by communication system 100 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Wireless link 140, and/or wireless link 141 can be a radio frequency, microwave, or other similar signal. Wireless link 140, and/or wireless link 141 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication to/from wireless devices 130-131 but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless devices 130-131 may be any device, system, combination of devices, or other such communication platform capable of communicating wirelessly with access node 110 using wireless links 140-142, respectively. Wireless devices 130-131 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110 using wireless links 140-142, respectively. Other types of communication platforms are possible.

Although only access node 110 is illustrated in FIG. 1, wireless devices 130-131 (and other wireless devices not depicted) can be in communication with a plurality of access nodes and/or small cells. The plurality of access nodes and/or small cells can be associated with different networks and can support different communication protocols and radio access technologies.

In an embodiment, alpha sector 150 uses beamforming to receive uplink communication from wireless device 130 (via wireless link 140). Likewise, gamma sector 152 can use beamforming to receive uplink communication from wireless device 131. Communication system 100 determines whether alpha sector 150 is using beamforming to communicate with a wireless device 130. When beamforming is being used, alpha sector 150 tracks wireless device 130 with the main beamforming lobe 120. Communication system 100 also determines (assuming beamforming is being used) the angle (i.e., N°) for the main beamforming lobe 120 being used by alpha sector 150 to receive uplink communication from wireless device 130.

When the angle, N°, of the main beamforming lobe 120 being used by alpha sector 150 exceeds a threshold angle, at least one sidelobe 125 which is directed to an area covered by another sector (i.e., gamma sector 152) is introduced. When alpha sector 150 and gamma sector 152 use the same frequency (i.e., a frequency reuse of 1), the transmissions from wireless device 131 (which lies in the direction of sidelobe 125) can interfere with the transmissions from wireless device 130 (which lies in the direction of main lobe 120.) This can degrade the performance of communication system 100. In particular, when the main sector (e.g., alpha sector 150) and the sidelobe sector (e.g., gamma sector 152) are both using beamforming, the sidelobe 125 of alpha sector 150 can overlap a main lobe of gamma sector 152 (not shown in FIG. 1.)

In an embodiment, communication system 100 (and access node 110, in particular), determines that the main beamforming lobe 120 of alpha sector 150 has exceeded a beamforming angle that causes a sidelobe 125 to be directed into gamma sector 152. When communication system 100 determines sidelobe 125 is directed into gamma sector 152 (i.e., by determining that angle N° has met a threshold criteria), communication system 100 configures wireless device 130 to use TTI bundling (and can select the amount of TTI bundling.)

In an embodiment, communication system 100 (and access node 110, in particular), determines that the main beamforming lobe 120 of alpha sector 150 has exceeded a beamforming angle that causes a sidelobe 125 to be formed and directed into gamma sector 152. Communication system 100 also determines that gamma sector 152 is using beamforming. Communication system 100 also determines the main lobe angle that gamma sector 152 is using. Based on whether alpha sector 150 is using beamforming, whether the main lobe 120 angle (N°) being used by alpha sector 150 meets a first threshold criteria (i.e., exceeds a threshold angle that causes side lobe 125 to be formed and directed into gamma sector 152), whether gamma sector 152 is using beamforming, whether the main lobe angle being used by gamma sector 152 meets a second threshold criteria (i.e., exceeds a threshold angle that causes the main lobe of gamma sector 152 to align with side lobe 152, and/or causes a side lobe of gamma sector 152 to align with main lobe 120 of alpha sector), communication system 100 configures wireless device 130 (and/or wireless device 131) to use TTI bundling (and selects the amount of TTI bundling—e.g., repeating transport blocks 2, 3, or 4 times.)

In an embodiment, communication system 100 determines whether alpha sector 150 is using beamforming to receive communication from a wireless device 130. Communication system 100 also determines whether a main beamforming lobe 120 being used by alpha sector 150 to receive communication from wireless device 130 meets a first threshold criteria. This first threshold criteria may correspond to an angle deviation from the central angle (i.e., 0°) of alpha sector 150 exceeding a first selected amount. This first selected amount may correspond to an angle that causes a sidelobe 125 to be formed and projected into another sector (i.e., beta sector 151 and/or gamma sector 152).

Communication system 100 determines whether gamma sector 152 (e.g., the sector where sidelobe 125 is projected) is using beamforming to receive communication (e.g., from wireless device 131, or other wireless devices not shown in FIG. 1.) Communication system 100 also determines whether the angle of a main beamforming lobe being used by gamma sector 152 meets a second threshold criteria. This second threshold criteria may correspond to an angle deviation from the central angle (i.e., 0°) of gamma sector 152 exceeding a second selected amount. This second selected amount may correspond to an angle that causes a sidelobe of gamma sector 152 to be formed and projected into alpha sector 150. This second selected amount may correspond to an angle that causes main lobe of gamma sector 152 to align with the sidelobe 125 projected by alpha sector 150.

Based on at least one of whether alpha sector 150 of access node 110 is using beamforming to receive communication from wireless device 130, whether the first threshold criteria is met, whether gamma sector 152 of access node 110 is using beamforming to receive communication, and whether the second threshold criteria is met, communication system 100 determines whether or not to use TTI bundling to communicate with wireless device 130 and/or wireless device 131. In addition, when TTI bundling is to be used, communication system 100 can, based on at least one of whether alpha sector 150 of access node 110 is using beamforming to receive communication from wireless device 130, whether the first threshold criteria is met, whether gamma sector 152 of access node 110 is using beamforming to receive communication, and whether the second threshold criteria is met, determine a TTI bundling size.

Communication system 100 may base a TTI bundling size selection on the number of wireless devices gamma sector 152 is using beamforming to communicate with. Communication system 100 may base a TTI bundling size selection on the number of wireless devices associated with a main beamforming lobes of gamma sector 152 that meet the second threshold.

In an embodiment, when alpha sector 150 does not use beamforming to communicate with wireless device 130, communication system 100 may elect to use TTI bundling for communication from wireless device 130. In an embodiment, when alpha sector 150 uses beamforming to communicate with wireless device 130, and gamma sector 152 is not using beamforming, communication system 100 may elect not to use TTI bundling for communication from wireless device 130. In an embodiment, when alpha sector 150 uses beamforming to communicate with wireless device 130, and gamma sector 152 is using beamforming, and main lobe 120 meets the first threshold criteria, communication system 100 may elect to use TTI bundling for communication from wireless device 130. In an embodiment, the number of wireless device communicating with gamma sector 152 that have a main beamforming lobes being used by gamma sector 152 that meet the second threshold criteria may be used as a basis for the selection of a TTI bundling size to be used by wireless device 130.

In an embodiment, alpha sector 150 of access node 110 may receive communication from wireless device 130 using beamforming by alpha sector 150. Communication at gamma sector 152 may be received from wireless devices (e.g., wireless device 131) using beamforming by gamma sector 152. Based on alpha sector 150 using beamforming to receive communication from wireless device 130, and based on gamma sector 152 using beamforming to receive communication from at least one additional wireless device, and based on a first angle, N°, of a first main beamforming lobe 120 being used by alpha sector 150 to receive communication from wireless device 130 meeting a first threshold criteria, communication system 100 (and/or access node 110, and/or alpha sector 150) may select a TTI bundling size to be used by alpha sector 150 for communication from wireless device 130.

This first threshold criteria may correspond to an angle deviation from the central angle (i.e., 0°) of alpha sector 150 exceeding a first selected amount. This first selected amount may correspond to an angle that causes a sidelobe 125 to be formed and projected into another sector (i.e., beta sector 151 and/or gamma sector 152).

The selected TTI bundling size may also have been further based on a second angle of a second main beamforming lobe being used by gamma sector to receive communication. This second threshold criteria may correspond to an angle deviation from the central angle (i.e., 0°) of gamma sector 152 exceeding a second selected amount. This second selected amount may correspond to an angle that causes a sidelobe of gamma sector 152 to be formed and projected into alpha sector 150. This second selected amount may correspond to an angle that causes main lobe of gamma sector 152 to align with the sidelobe 125 projected by alpha sector 150.

The selected TTI bundling size may also be further based on the number of additional wireless devices associated with main beamforming lobes that meet the second threshold criteria. This number of additional wireless devices associated with main beamforming lobes that meet the second threshold criteria may have been communicated from gamma sector 152 to alpha sector 150.

Figure 2:
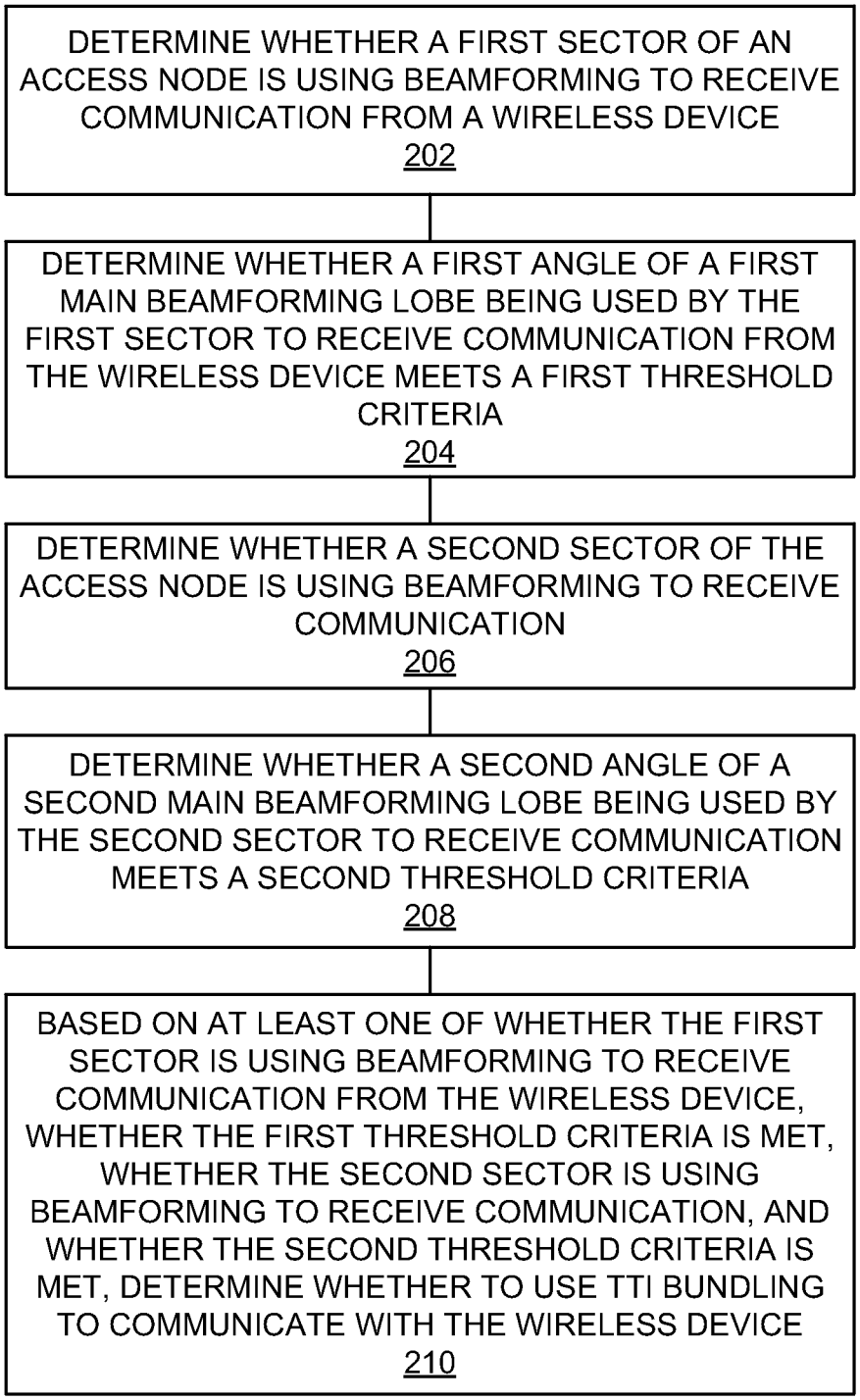
FIG. 2 is a flowchart illustrating a method of operating a communication system.

FIG. 2 is a flowchart illustrating a method of operating a communication system. The steps illustrated in FIG. 2 may be performed by one or more elements of communication system 100. It is determined whether a first sector of an access node is using beamforming to receive communication from a wireless device (202). For example, access node 110 may determine that alpha sector 150 is using beamforming to receive communication from wireless device 130.

It is determined whether a first angle of a first main beamforming lobe being used by the first sector to receive communication form the wireless device meets a first threshold criteria (204). For example, access node 110 may determine whether the angle N° of main beamforming lobe 120 meets a first threshold criteria. This first threshold criteria may, for example, correspond to an angle that exceeds a first selected amount. This first selected amount may, for example, correspond to an angle that causes a sidelobe 125 to be formed and projected into another sector (i.e., beta sector 151 and/or gamma sector 152).

It is determined whether a second sector of the access node is using beamforming to receive communication (206). For example, access node 110 may determine that gamma sector 152 is using beamforming to receive communication from, for example, wireless device 131.

It is determined whether a second angle of a second main beamforming lobe being used by the second sector to receive communication meets a second threshold criteria (208). For example, access node 110 may determine whether a main lobe beamforming angle being used by gamma sector 152 meets a second threshold criteria. This second threshold criteria may correspond to an angle deviation from the central angle (i.e., 0°) of gamma sector 152 exceeding a second selected amount. This second selected amount may correspond to an angle that causes a sidelobe of gamma sector 152 to be formed and projected into alpha sector 150. This second selected amount may correspond to an angle that causes main lobe of gamma sector 152 to align with the sidelobe 125 projected by alpha sector 150.

It is determined, based on at least one of whether the first sector is using beamforming to receive communication from the wireless device, whether the first threshold criteria is met, whether the second sector is using beamforming to receive communication, and whether the second threshold criteria is met, whether to use TTI bundling to communicate with the wireless device. For example, access node 110 may determine whether to use TTI bundling based on at least one of: whether alpha sector 150 is using beamforming to receive communication from wireless device 130; whether the angle N° of main beamforming lobe 120 meets the first threshold criteria; whether gamma sector 152 is using beamforming to receive communication from wireless device 131; and whether the second threshold criteria is met.

Figure 3:
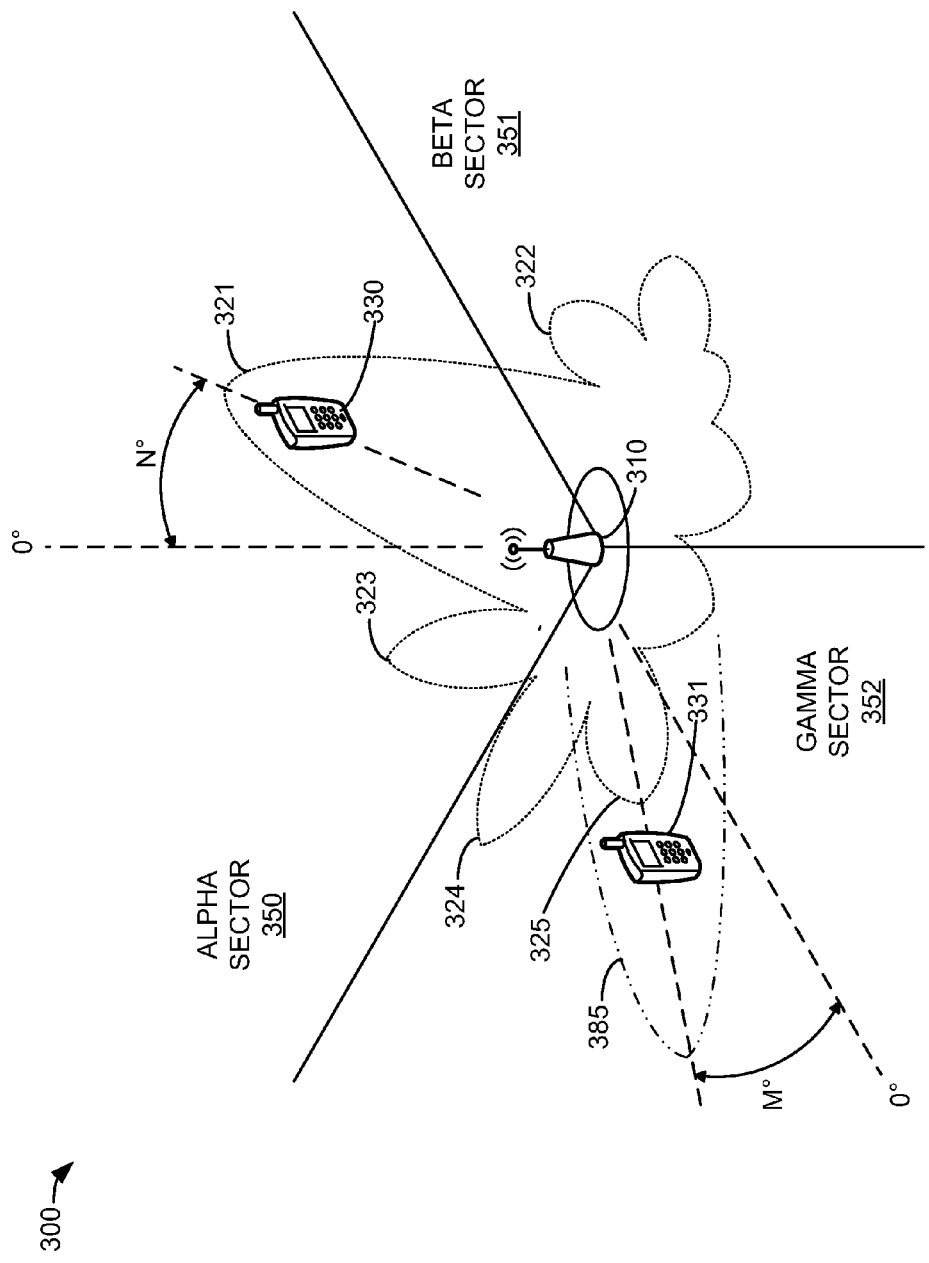
FIG. 3 is a diagram illustrating a communication system with beamforming lobes.

FIG. 3 is a diagram illustrating a communication system with beamforming lobes. In FIG. 3, communication system 300 comprised access node 310, wireless device 330, and wireless device 331. Access node 310 includes three sectors: alpha sector 350, beta sector 351, and gamma sector 352. Wireless device 330 is operatively coupled to access node 310 via a wireless link. Wireless device 331 is operatively coupled to access node 310 via wireless link. Wireless device 330 is positioned in alpha sector 350. Wireless device 331 is positioned in gamma sector 352.

In FIG. 3, alpha sector 350 of access node 310 is illustrated with a main beamforming lobe 321 directed at an angle of N° from the central angle (i.e., 0°) of alpha sector 350. This angle of N° directs main beamforming lobe 321 at wireless device 330. Alpha sector 350 of access node 310 is also illustrated as having at least sidelobes 322-325. Sidelobe 325 is illustrated as directed at an angle of M° from the center (i.e., 0°) of gamma sector 352. Thus, in FIG. 3, at least sidelobe 325 of alpha sector 350 is illustrated lying in gamma sector 352, and is also directed at wireless device 331.

Also in FIG. 3, gamma sector 352 of access node 310 is illustrated with a main beamforming lobe 385 directed at an angle of M° from the central angle (i.e., 0°) of gamma sector 352. This angle of M° directs main beamforming lobe 385 at wireless device 331. Thus, in FIG. 3, at least sidelobe 325 of alpha sector 350 is illustrated a being aligned (or roughly aligned) with main beamforming lobe 385 being used by gamma sector 352 to receive communication from wireless device 331.

Access node 310 is a network node having a plurality of sectors 350-352 each of which is capable of providing wireless communication to wireless device 330 and wireless device 331. Access node 310 can be, for example, one or more of a base transceiver station, a radio base station, an eNodeB device, or an enhanced eNodeB device.

Communication system 300 is a communication network that can provide wireless communication to wireless device 330 and wireless device 331. Communication system 300 and/or an included network can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 300 and an included network can also comprise wireless networks, including base station, wireless communication nodes, telephony switches, internet routers, network gateways, computer systems, communication links, or some other type of communication equipment, and combinations thereof.

Wired network protocols that may be utilized by communication system 300 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 300 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 300, can be, for example, twisted pair cable, coaxial cable or fiber optic cable, or combinations thereof. Communication between access node 310 and wireless device 330-331 can be a radio frequency, microwave, or other similar signal. This communication can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication to/from wireless devices 330-331 but are omitted for clarity, such as base stations, base station controllers, gateways, mobile switching centers, dispatch application processors, and location registers such as a home location register or visitor location register. Furthermore, other network elements may be present to facilitate communication between among elements of communication system 300 which are omitted for clarity, including additional processing nodes, routers, gateways, and physical and/or wireless data links for carrying data among the various network elements.

Wireless devices 330-331 may be any device, system, combination of devices, or other such communication platform capable of communicating wirelessly with access node 310 using wireless links Wireless devices 330-331 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110 using wireless links Other types of communication platforms are possible.

Although only access node 310 is illustrated in FIG. 3, wireless devices 330-331 (and other wireless devices not depicted in FIG. 3) can be in communication with a plurality of access nodes and/or small cells. The plurality of access nodes and/or small cells can be associated with different networks and can support different communication protocols and radio access technologies.

In an embodiment, alpha sector 350 uses main beamforming lobe 321 to receive uplink communication from wireless device 330. When beamforming is being used by alpha sector 350, alpha sector 350 tracks wireless device 330 (e.g., by varying angle N°) with main beamforming lobe 321. Gamma sector 352 uses main beamforming lobe 385 to receive uplink communication from wireless device 331. When beamforming is being used by gamma sector 385, gamma sector 385 tracks wireless device 331 (e.g., by varying angle M°) with main beamforming lobe 385.

When the angle N° exceeds a threshold angle, at least one sidelobe 325 is directed to an area covered by another sector (i.e., gamma sector 352.) Since alpha sector 350 and gamma sector 352 use the same frequency band (i.e., a frequency reuse of 1), wireless device 331 (which lies in the direction of sidelobe 325) interferes with the transmissions from wireless device 330 (which lies in the direction of main lobe 321.) This can degrade the performance of communication system 300. In particular, when the main sector (e.g., alpha sector 350) and the sidelobe sector (e.g., gamma sector 352) are both using beamforming, a sidelobe 325 of alpha sector 350 can overlap or align with the main beamforming lobe 385 of gamma sector 352.

Access node 310 determines that the main beamforming lobe 321 of alpha sector 350 has exceeded a beamforming angle that causes a sidelobe 325 to be directed into gamma sector 352. When access node 310 determines sidelobe 325 is directed into gamma sector 352 (i.e., by determining that angle N° has met a threshold criteria), access node 310 configures wireless device 330 to use TTI bundling. Access node 310 may also select the amount of TTI bundling.

Access node 310 determines that main beamforming lobe 321 of alpha sector 350 has exceeded a beamforming angle that causes a sidelobe 325 to be directed into gamma sector 352. Access node 310 determines that gamma sector 352 is using beamforming. Access node 310 determines (or receives) what main lobe angle M° gamma sector 352 is using. Based on whether alpha sector 350 is using beamforming, whether the main lobe 321 angle (N°) being used by alpha sector 350 meets a first threshold criteria (i.e., exceeds a threshold angle that causes side lobe 325 to be directed into gamma sector 352), whether gamma sector 352 is using beamforming, whether the main lobe angle M° being used by gamma sector 352 meets a second threshold criteria (i.e., exceeds a threshold angle that causes the main lobe 385 of gamma sector 352 to align with side lobe 325, and/or causes a sidelobe of gamma sector 352 to align with main lobe 321 of alpha sector 350), access node 310 configures wireless device 330 (and/or wireless device 331) to use TTI bundling (and selects the amount of TTI bundling—e.g., selecting a repetition rate of 2, 3, or 4 times.)

In an embodiment, access node 310 determines whether alpha sector 350 is using beamforming to receive communication from a wireless device 330. Access node 310 also determines whether a main beamforming lobe 321 being used by alpha sector 350 to receive communication from wireless device 330 meets a first threshold criteria. This first threshold criteria may correspond to an angle deviation of N° from the central angle (i.e., 0°) of alpha sector 350 exceeding a first selected amount. This first selected amount may correspond to an angle that causes a sidelobe 325 to be formed and projected into another sector (i.e., beta sector 351 and/or gamma sector 352).

Access node 310 determines whether gamma sector 352 is using beamforming to receive communication (e.g., from wireless device 331.) Access node 310 also determines whether a main beamforming lobe being used by gamma sector 352 meets a second threshold criteria. This second threshold criteria may correspond to an angle deviation of M° from the central angle (i.e., 0°) of gamma sector 352 exceeding a second selected amount. This second selected amount may correspond to an angle that causes a sidelobe of gamma sector 352 to be formed and projected into alpha sector 350. This second selected amount may correspond to an angle that causes main lobe 385 of gamma sector 352 to align with the sidelobe 325.

Based on at least one of whether alpha sector 350 of access node 310 is using beamforming to receive communication from wireless device 330, whether the first threshold criteria is met, whether gamma sector 352 of access node 310 is using beamforming to receive communication, and whether the second threshold criteria is met, access node 310 determines whether or not to use TTI bundling to communicate with wireless device 330. In addition, when TTI bundling is being used by wireless device 330, access node 310 can, based on at least one of whether alpha sector 350 of access node 310 is using beamforming to receive communication from wireless device 330, whether the first threshold criteria is met, whether gamma sector 352 of access node 310 is using beamforming to receive communication, and whether the second threshold criteria is met, determine a TTI bundling size for wireless device 330 to use.

Access node 310 may base a TTI bundling size selection on the number of wireless devices 331 gamma sector 352 is using beamforming to communicate with. Access node 310 may base a TTI bundling size selection on the number of wireless devices 331 associated with the main beamforming lobes 385 of gamma sector 352 that meet the second threshold.

In an embodiment, when alpha sector 350 does not use beamforming to communicate with wireless device 330, access node 310 may elect to use TTI bundling for communication from wireless device 330. In an embodiment, when alpha sector 350 uses beamforming to communicate with wireless device 330, and gamma sector 352 is not using beamforming, access node 310 may elect not to use TTI bundling for communication from wireless device 330. In an embodiment, when alpha sector 350 uses beamforming to communicate with wireless device 330, and gamma sector 352 is using beamforming, and main lobe 321 meets the first threshold criteria, access node 310 may elect to use TTI bundling for communication from wireless device 330. In an embodiment, the number of wireless device communicating with gamma sector 352 that have a main beamforming lobes being used by gamma sector 352 that meet the second threshold criteria may be used as a basis for the selection of a TTI bundling size to be used by wireless device 330.

In an embodiment, alpha sector 350 of access node 310 may receive communication from wireless device 330 using beamforming by alpha sector 350. Communication to gamma sector 352 may be received from wireless device 131 using beamforming by gamma sector 352. Based on alpha sector 350 using beamforming to receive communication from wireless device 330, and based on gamma sector 352 using beamforming to receive communication from at least one additional wireless device (e.g., wireless device 331), and based on a first angle, N°, of a first main beamforming lobe 320 being used by alpha sector 350 to receive communication from wireless device 330 meeting a first threshold criteria, access node 310 may select a TTI bundling size to be used by alpha sector 350 for communication from wireless device 330.

This first threshold criteria may correspond to an angle deviation N° from the central angle (i.e., 0°) of alpha sector 350 exceeding a first selected amount. This first selected amount may correspond to an angle that causes a sidelobe 325 to be formed and projected into another sector (e.g., gamma sector 352).

The selected TTI bundling size may also have been further based on a second angle of a second main beamforming lobe being used by gamma sector 352 to receive communication. This second threshold criteria may correspond to an angle deviation M° from the central angle (i.e., 0°) of gamma sector 352 exceeding a second selected amount. This second selected amount may correspond to an angle that causes a sidelobe of gamma sector 352 to be formed and projected into alpha sector 350. This second selected amount may correspond to an angle that causes main lobe 385 of gamma sector 352 to align with the sidelobe 325.

The selected TTI bundling size may also have been further based on the number of additional wireless devices associated with main beamforming lobes 385 that meet the second threshold criteria. This number of additional wireless devices associated with gamma sector 352 main beamforming lobes 385 that meet the second threshold criteria may be by gamma sector 352 (or access node 310) to alpha sector 350.

Figure 4:
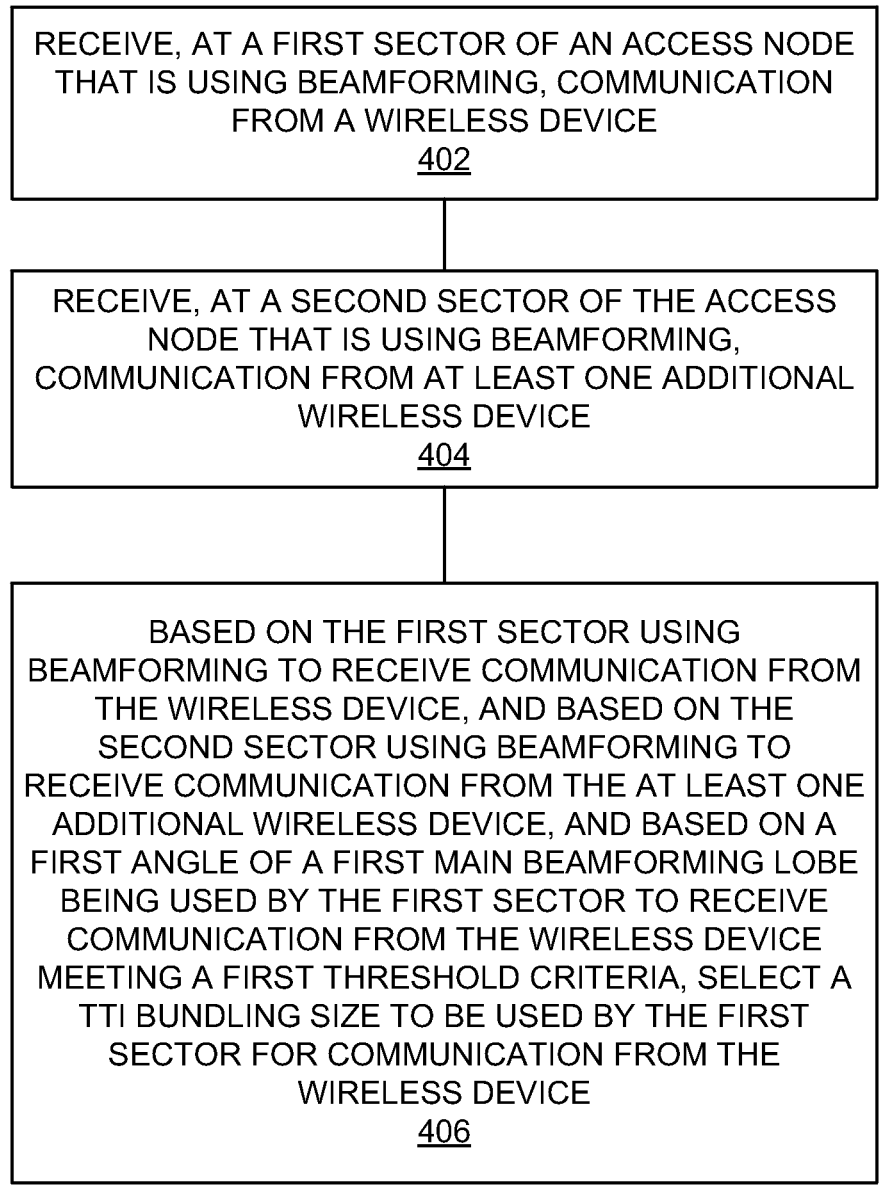
FIG. 4 is a flowchart illustrating a method of selecting a TTI bundling size.

FIG. 4 is a flowchart illustrating a method of selecting a TTI bundling size. The steps illustrated in FIG. 4 may be performed by one or more elements of communication system 100 and/or communication system 300. At a first sector of an access node that is using beamforming, communication from a wireless device is received (402). For example, at alpha sector 350 of access node 310, communication from wireless device 330 may be received coming from the direction of main lobe 321.

At a second sector of the access node that is using beamforming, communication from at least one additional wireless device is received (404). For example, at gamma sector 352 of access node 310, communication from wireless device 331 may be received coming from the direction of main lobe 385.

Based on the first sector using beamforming to receive communication from the wireless device, and based on the second sector using beamforming to receive communication from the at least one additional wireless device, and based on a first angle of a first main beamforming lobe being used by the first sector to receive communication from the wireless device meeting a first threshold criteria, a TTI bundling size is selected to be used by the first sector for communication from the wireless device (406). For example, access node 310 may select a TTI bundling size based on whether alpha sector 350 and/or gamma sector 352 are using beamforming, and whether the beamforming angle N° being used by alpha sector 350 exceeds a certain angle and is therefore likely to experience interference from wireless device 331.

FIG. 5 is a flowchart illustrating a TTI bundling size selection method. The steps illustrated in FIG. 5 may be performed by one or more elements of communication system 100 and/or communication system 300. By a first sector of an access node, beamforming having a first main lobe angle to receive communication from a first wireless device is used (502). For example, alpha sector 350 may use beamforming having a main lobe angle of N° to receive communication from wireless device 330.

By a second sector of an access node, beamforming having a second main lobe angle to receive communication from a second wireless device is used (504). For example, gamma sector 352 may use beamforming having a main lobe angle of M° to receive communication from wireless device 331.

Based on the first angle and the second angle, a TTI bundling size is selected (506). For example, based on the angle of N° for main beamforming lobe 321, and M° for main beamforming lobe 385, access node 310 may select a TTI bundling size to be used by wireless device 330. Since the angle of M° corresponds to the direction of wireless device 331 relative to access node 310, the angle M° provides and indicator of whether wireless device 331 may be aligned with the direction of a sidelobe 325. In addition, the TTI bundling size may be further based on the number of wireless devices 331 that are aligned relative to access node (or approximately aligned) with a sidelobe 321-325 of alpha sector 350.

FIG. 6 is a flowchart illustrating a selection method that is based on beamforming angles. The steps illustrated in FIG. 6 may be performed by one or more elements of communication system 100 and/or communication system 300. By a first sector of an access node, beamforming having a first main lobe angle to receive communication from a first wireless device is used (602). For example, alpha sector 350 may use beamforming having a main lobe angle of N° to receive communication from wireless device 330.

By a second sector of an access node, beamforming having a second main lobe angle to receive communication from a second wireless device is used (604). For example, gamma sector 352 may use beamforming having a main lobe angle of M° to receive communication from wireless device 331. The number of the plurality of main lobe angles that meet a threshold criteria is determined (606). For example, gamma sector 352 may determine the number of main beamforming lobes 385 gamma sector 352 is using that exceed a threshold criteria (e.g., are pointed within a threshold angle of the boundary of alpha sector 350 and gamma sector 352.)

The number of the plurality of main lobe angles that meet the threshold criteria is communicated to the first sector of the access node (608). For example, gamma sector 352 may communicate to alpha sector 350 the number of main lobe angles being used by gamma sector 352 that point within a threshold angle of the boundary between alpha sector 350 and gamma sector 352.

Based on the first angle and the number of the plurality of main lobe angles that meet the threshold criteria, a TTI bundling size is selected for communication from the first wireless device (610). For example, based on the angle of main lobe 321 used by alpha sector 350 to receive communication from wireless device 330, and the number of main lobes 385 being used by gamma sector that are within the threshold angle of the boundary of alpha sector 350 and gamma sector 352, alpha sector 350 may select a TTI bundling size for wireless device 330 to use.

The methods, systems, devices, networks, access nodes, processing node, control nodes, and equipment described above may be implemented with, contain, or be executed by one or more computer systems and/or processing nodes. The methods described above may also be stored on a non-transitory computer readable medium. Many of the elements of communication system 100, and/or communication system 300 may be, comprise, or include computers systems and/or processing nodes. This includes, but is not limited to: access node 110, access node 310, wireless device 130, wireless device 131, wireless device 330, and/or wireless device 331.

Figure 7:
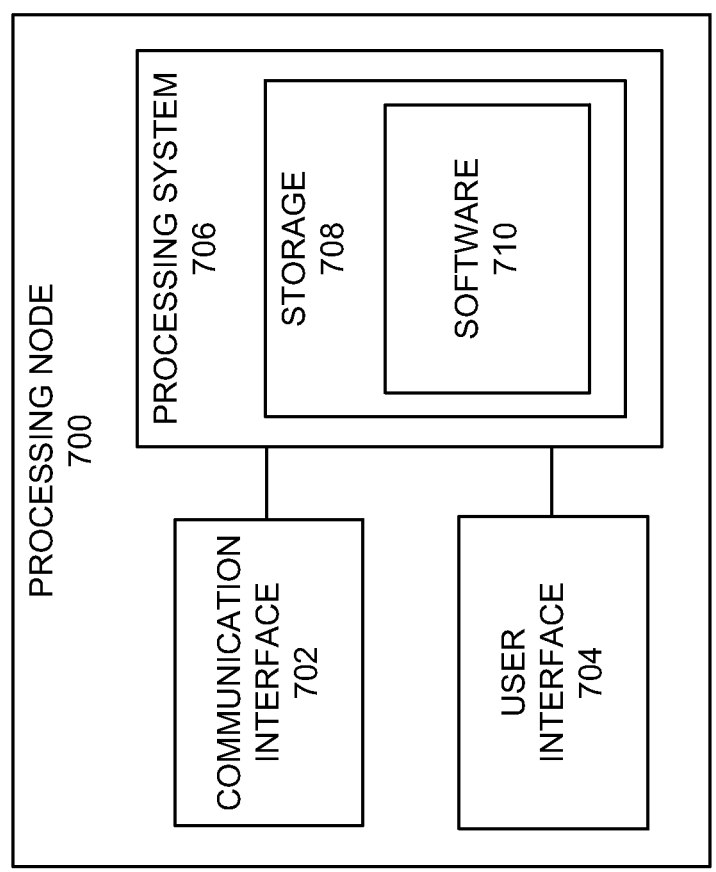
FIG. 7 illustrates a processing node.

FIG. 7 illustrates an exemplary processing node 700 comprising communication interface 702, user interface 704, and processing system 706 in communication with communication interface 702 and user interface 704. Processing node 700 is capable of paging a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 includes access node 110 and access node 310. Processing node 700 can also be an adjunct or component of a network element, such as an element of access node 110, and/or 310, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   determining whether a first sector of an access node is using beamforming to receive communication from a wireless device;
   determining whether a first angle of a first main beamforming lobe being used by the first sector to receive communication from the wireless device meets a first threshold criteria;
   determining whether a second sector of the access node is using beamforming to receive communication;
   determining whether a second angle of a second main beamforming lobe being used by the second sector to receive communication meets a second threshold criteria; and,
   based on at least one of whether the first sector of an access node is using beamforming to receive communication from the wireless device, whether the first threshold criteria is met, whether the second sector of the access node is using beamforming to receive communication, and whether the second threshold criteria is met, determining whether to use TTI bundling to communicate with the wireless device.

2. The method of claim 1, further comprising:
   when TTI bundling is being used to communicate with the wireless device, determining a TTI bundling size based at least one of whether the first sector of an access node is using beamforming to receive communication from the wireless device, whether the first threshold criteria is met, whether the second sector of the access node is using beamforming to receive communication, and whether the second threshold criteria is met.

3. The method of claim 2, wherein the TTI bundling size is further based on a number of wireless devices communicating with the second sector that the second sector of the access node is using beamforming to communicate with.

4. The method of claim 2, wherein the TTI bundling size is further based on a number of wireless devices communicating with the second sector that have a main beamforming lobe being used by the second sector to receive communication from the respective wireless devices communicating with the second sector that meet the second threshold criteria.

5. The method of claim 1, wherein, based on the first sector of the access node not using beamforming to receive communication from the wireless device, using TTI bundling for communication from the wireless device.

6. The method of claim 1, wherein, based on based on the first sector of the access node using beamforming to receive communication from the wireless device, and the second sector of the access node not using beamforming to receive communication, not using TTI bundling for communication from the wireless device.

7. The method of claim 1, wherein, based on the first sector of the access node using beamforming to receive communication from the wireless device, the second sector of the access node using beamforming to receive communication, and the first criteria being met, using TTI bundling for communication from the wireless device.

8. The method of claim 7, wherein a TTI bundling size for communication from the wireless device is selected based on a number of wireless devices communicating with the second sector that have a main beamforming lobe being used by the second sector to receive communication from the respective wireless devices communicating with the second sector that meet the second threshold criteria.

9. A communication system, comprising:
a first sector of an access node that can use beamforming to receive communication from a wireless device;
a second sector of the access node that can use beamforming to receive communication; and,
a processing node to:
determine whether a first sector of an access node is using beamforming to receive communication from a wireless device;
determine whether a first angle of a first main beamforming lobe being used by the first sector to receive communication from the wireless device meets a first threshold criteria;
determine whether a second sector of the access node is using beamforming to receive communication;
determine whether a second angle of a second main beamforming lobe being used by the second sector to receive communication meets a second threshold criteria; and,
based on at least one of whether the first sector of an access node is using beamforming to receive communication from the wireless device, whether the first threshold criteria is met, whether the second sector of the access node is using beamforming to receive communication, and whether the second threshold criteria is met, determine whether to use TTI bundling to communicate with the wireless device.

10. The communication system of claim 9, wherein when TTI bundling is being used to communicate with the wireless device, the first sector is configured to use a TTI bundling size that is based at least one of whether the first sector of an access node is using beamforming to receive communication from the wireless device, whether the first threshold criteria is met, whether the second sector of the access node is using beamforming to receive communication, and whether the second threshold criteria is met.

11. The communication system of claim 10, wherein the TTI bundling size is further based on a number of wireless devices communicating with the second sector that the second sector of the access node is using beamforming to communicate with.

12. The communication system of claim 10, wherein the TTI bundling size is further based on a number of wireless devices communicating with the second sector that have a main beamforming lobe being used by the second sector to receive communication from the respective wireless devices communicating with the second sector that meet the second threshold criteria.

13. The communication system of claim 9, wherein, based on the first sector of the access node not using beamforming to receive communication from the wireless device, the first sector is configured to use TTI bundling for communication from the wireless device.

14. The communication system of claim 9, wherein, based on based on the first sector of the access node using beamforming to receive communication from the wireless device, and the second sector of the access node not using beamforming to receive communication, the first sector is configured to not use TTI bundling for communication from the wireless device.

15. The communication system of claim 9, wherein, based on the first sector of the access node using beamforming to receive communication from the wireless device, the second sector of the access node using beamforming to receive communication, and the first criteria being met, the first sector is configured to use TTI bundling for communication from the wireless device.

16. The communication system of claim 15, wherein a TTI bundling size for communication from the wireless device to the first sector of the access node is selected based on a number of wireless devices communicating with the second sector that have a main beamforming lobe being used by the second sector to receive communication from the respective wireless devices communicating with the second sector that meet the second threshold criteria.

17. A method of operating a communication system, comprising:
receiving, at a first sector of an access node, communication from a wireless device using beamforming by the first sector;
receiving, at a second sector of the access node, communication from at least one additional wireless device using beamforming by the second sector; and,
based on the first sector using beamforming to receive communication from the wireless device, and based on the second sector using beamforming to receive communication from the at least one additional wireless device, and based on a first angle of a first main beamforming lobe being used by the first sector to receive communication from the wireless device meeting a first threshold criteria, selecting a TTI bundling size to be used by the first sector for communication from the wireless device.

18. The method of claim 17, wherein the TTI bundling size to be used by the first sector for communication from the wireless device is further based on a second angle of a second main beamforming lobe being used by the second sector to receive communication from the at least one additional wireless device meeting a second threshold criteria.

19. The method of claim 18, wherein the TTI bundling size to be used by the first sector for communication from the wireless device is further based on the number of the at least one additional wireless devices meeting the second threshold criteria.

20. The method of claim 19, further comprising:
communicating the number of the at least one additional wireless devices meeting the second threshold criteria to the first sector.

* * * * *